United States Patent
Peters et al.

[11] Patent Number: 6,158,397
[45] Date of Patent: Dec. 12, 2000

[54] PROCESS FOR REDUCING THE SOOT CONTENT OF DIESEL ENGINE EXHAUST GASES AND DEVICE FOR IMPLEMENTING IT

[75] Inventors: Norbert Peters; Caroline Born; Christian Antoni; Tobias Plessing, all of Aachen, Germany

[73] Assignee: Degussa Aktiengesellschaft, Frankfurt, Germany

[21] Appl. No.: 09/171,883

[22] PCT Filed: May 2, 1997

[86] PCT No.: PCT/EP97/02253

§ 371 Date: Jun. 28, 1999

§ 102(e) Date: Jun. 28, 1999

[87] PCT Pub. No.: WO97/42405

PCT Pub. Date: Nov. 13, 1997

[30] Foreign Application Priority Data

May 4, 1996 [DE] Germany ............ 196 17 885

[51] Int. Cl.⁷ .................................................. F02B 75/12
[52] U.S. Cl. .................................... 123/1 A; 123/25 R
[58] Field of Search ................. 123/1 A, 27 GE, 123/299, 300, 25 C, 25 G

[56] References Cited

U.S. PATENT DOCUMENTS

| | | | |
|---|---|---|---|
| 4,222,351 | 9/1980 | Kosaka et al. | 123/1 A |
| 4,290,392 | 9/1981 | Dissmore | 123/25 C |
| 4,359,969 | 11/1982 | Mellovist et al. | 123/1 A |
| 4,476,817 | 10/1984 | Lindberg | 123/25 R |
| 5,105,772 | 4/1992 | Olsson et al. | 123/1 A |
| 5,400,746 | 3/1995 | Susa et al. | 123/25 C |
| 5,601,067 | 2/1997 | Wirbeleit et al. | 123/25 E |
| 5,647,304 | 7/1997 | Nyberg et al. | 123/1 A |
| 5,771,847 | 6/1998 | Duva | 123/1 A |

FOREIGN PATENT DOCUMENTS

| | | |
|---|---|---|
| 2 406 723 | 5/1978 | France . |
| 1 601 339 | 1/1971 | Germany . |
| 44 22 552 | 11/1995 | Germany . |

*Primary Examiner*—Thomas N. Moulis
*Attorney, Agent, or Firm*—Smith Gambrell & Russell, LLP

[57] ABSTRACT

In order to reduce the soot content of a diesel engine's exhaust gas, a fluid containing a peroxide compound, preferably an aqueous hydrogen peroxide solution, is fed into the combustion chamber after the start of the injection and combustion of the fuel, preferably following the combustion phase. The diesel fuel is preferably injected in the range 10°±5° before top dead center and the fluid containing the peroxide compound is fed in the range 5° to 30° after top dead center. Use may be made for the alternate supply of diesel fuel and hydrogen peroxide of a shared injection nozzle (FIG. 1) which supplies one or other of the media depending on the pressure of the diesel fuel and hydrogen peroxide solution supplied.

12 Claims, 4 Drawing Sheets

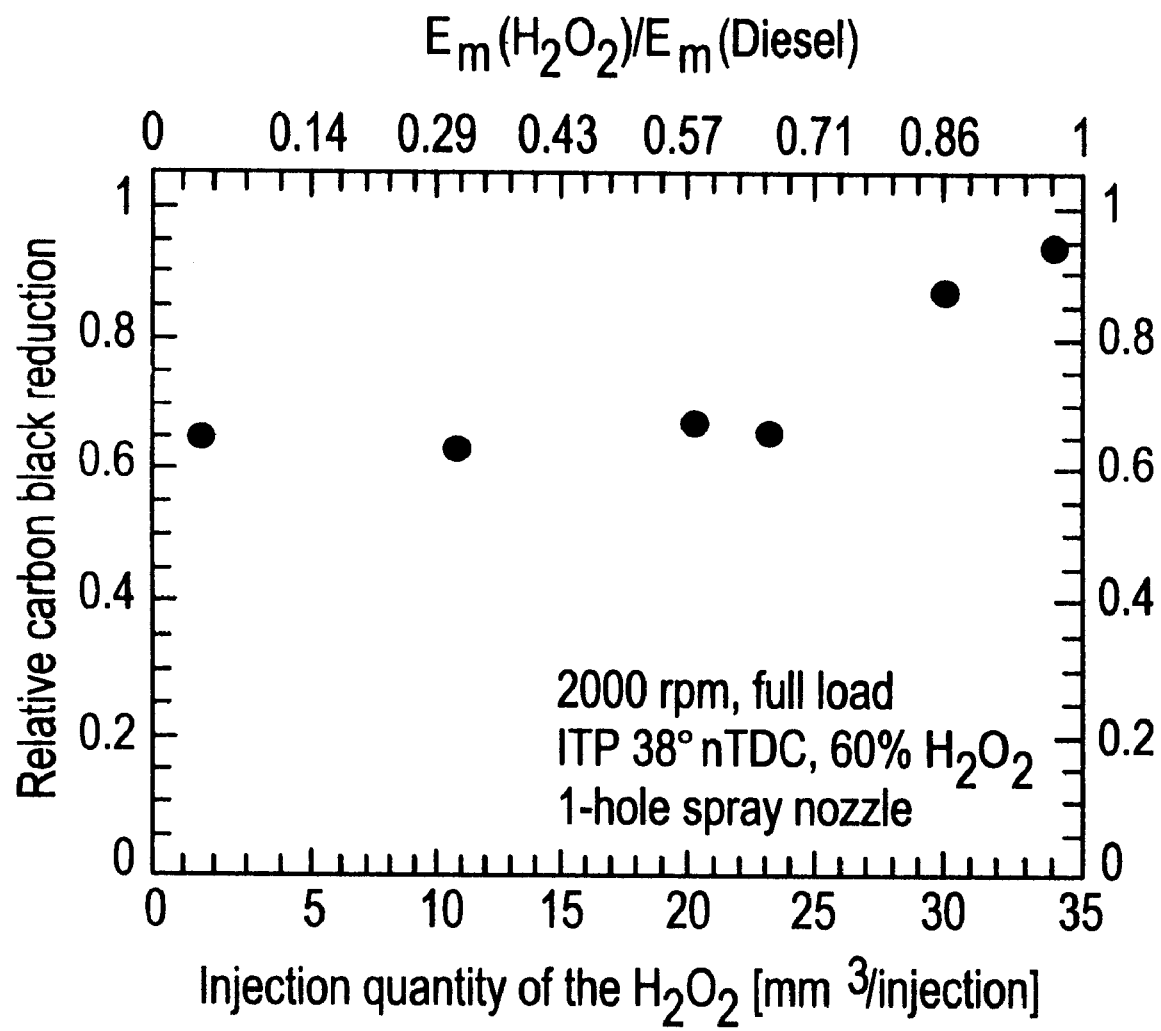

PROCESS FOR REDUCING THE SOOT CONTENT OF DIESEL ENGINE EXHAUST GASES AND DEVICE FOR IMPLEMENTING IT

This application was filed under 37 U.S.C. § 371, and claims priority to International application PCT/EP97/02253, filed on May 2, 1997, which claims priority to German patent application 196 17 885.1, filed on May 4, 1996.

BACKGROUND OF THE INVENTION

The invention concerns a method for the reduction of the carbon black content in the waste gas of a diesel engine and a device to carry out this method.

As in the past, the emission of carbon black and $NO_x$ represents one of the greatest problems of the diesel engine. All previous strategies for the reduction of pollutants exhibit a "see-saw" effect between the carbon black and $NO_x$ waste gas concentration. By a time shift of the beginning of the injection in the direction of a later injection, it is possible to reduce the formation of carbon black, but this leads to higher $NO_x$ emissions. The waste gas recycling method, on the other hand, makes possible a reduction of the $NO_x$ production by the lower temperatures in the engine, but involves a strongly increased carbon black emission.

By additional injection of water into the combustion chamber, it is possible to reduce the $NO_x$ formation by reducing the combustion temperature—see Amin Velji et al., MTZ Motorentechnische Zeitschrift 57 (1996) 7/8, 400–407. A simultaneous reduction of the carbon black emission is attained only if water in the form of a diesel-water emulsion is introduced into the combustion chamber, but not if water is introduced into the combustion chamber with the combustion air or directly by a stratified injection.

From European Patent No. B 0,333,704, a method is known for reducing the fraction of harmful substances in the waste gas—namely CO, HC, and $NO_x$—of a combustion process, in which hydrocarbon compounds participate, by supplying a liquid composition which contains a peroxide, such as hydrogen peroxide or another peroxy compound and water, into the combustion process—with the combustion air and/or the fuel-air mixture. The supply to the combustion process takes place in that known method already during the introduction or within the ignition phase of the combustion process. A carbon black reduction in the waste gas cannot be attained in the method execution indicated in this document. The liquid composition can contain 10 to 80 vol % hydrogen peroxide, which decomposes into OH radicals in the combustion chamber, which, in turn, favor the combustion.

SUMMARY OF THE INVENTION

The goal of the invention is to reduce the carbon black emission during the diesel motor combustion, using peroxy compounds, wherein, at the same time, the $NO_x$ emission should not be negatively influenced and preferably should be lowered simultaneously.

The desired goal of a reduction of the carbon black content in the waste gas of a diesel engine, into whose combustion chamber diesel fuel is injected and burned in cycles, is attained, in accordance with the invention, in that after the beginning of the injection and combustion of the fuel, liquid containing a peroxy compound from the series of hydrogen peroxide and other peroxy compounds, in particular, organic peroxy compounds, is supplied to the combustion chamber.

Hydrogen peroxide or the peroxy compound is appropriately supplied in the form of a water-containing liquid, usually in the form of a solution. The other peroxy compounds are—except for $H_2O_2$—organic peroxy compounds, such as peroxy carboxylic acids and hydroperoxides. Peroxy salts are generally less suitable because of the incrustation which thereby arises. Particularly preferred is an aqueous $H_2O_2$ solution with a content of 10 to 75 wt %, in particular, 30 to 50 wt %.

The invention is based on the idea of eliminating carbon black particles formed during the combustion of diesel fuel toward the end and, in particular, following the combustion phase with the aid of hydrogen peroxide or another peroxy compound, supplied at this time to the combustion process, at least extensively by combustion.

During the diesel engine combustion process, carbon black is formed in the combustion phase following the self-ignition; this carbon black, however, is again oxidized, for the most part, by the OH radicals still present during this phase. The combustion phase is concluded when, on the basis of the declining temperature during the expansion, a chain termination of the chemical reactions takes place. The chemically active radicals O, H, and OH thereby recombine to $H_2O$ and $O_2$. Since the OH radical is mainly responsible for the carbon black oxidation, the carbon black oxidation also comes to a standstill at this time. In order to be able to oxidize carbon black still present in the combustion chamber, it is ensured, in accordance with the invention, that around this time, a source for OH radicals in an effective quantity, additionally made available, is present.

In the method of the invention, the $H_2O_2$ molecule serves primarily as a supplier of the OH radical needed for the oxidation process of carbon black. At the gas temperatures between 1200 K and 2000 K, which are present following the combustion phase, it dissociates very rapidly to form two OH radicals. With a sufficient metering by a suitable injection technology, in combination with a sufficiently good atomization quality, it is possible to attain, in this way, an extensive carbon black oxidation. In combination with a waste gas recycling, both carbon black and $NO_x$ emissions are reduced.

In accordance with a preferred execution of the method of the invention, a small metered quantity of an aqueous hydrogen peroxide solution is injected, and to the largest extent possible, atomized, following the combustion phase, for the completion of the combustion and thus the reduction of carbon black particles in the waste gas. The term "following the combustion phase" is understood to mean the time when a substantial part of the fuel is burned. Appropriately, the injection of the liquid containing a peroxy compound takes place in the range of 5 to 40° crank angle after the beginning of the injection of the diesel fuel into the combustion chamber.

Whereas the diesel fuel injection usually takes place around 10°±5° before the top dead center (OT) of a diesel engine compression stroke, the liquid containing $H_2O_2$ or another peroxy compound, to be used in accordance with the invention, is injected after the top dead center. Preferably, in this case, the injection of the peroxy compound-containing liquid takes place in the range from 50° to 30° crank angle, in particular 5° to 20°, after the top dead center. The time within which the liquid injection is to take place lies approximately in the range of that of the diesel fuel injection and thus preferably, in the range from 0.5 to 2 ms.

The injection of the diesel fuel and of the $H_2O_2$ or another peroxy compound-containing liquid can take place by separate injection nozzles. The injection nozzle for the peroxy compound-containing liquid to be supplied can be the same nozzle as is usually used for the diesel fuel injection. Alternately, a single common injection nozzle for the alternating supply of the diesel fuel and the liquid containing a peroxy compound can be used for the injection of this liquid and of the diesel fuel.

BRIEF DESCRIPTION OF THE DRAWINGS

The invention is described in more detail with the aid of the FIGS. 1 to 4.

FIG. 4 shows the relative carbon black reduction as a function of the injection quantity of aqueous $H_2O_2$ solution (content: 60 wt %).

DETAILED DESCRIPTION OF THE INVENTION

Figure 1:
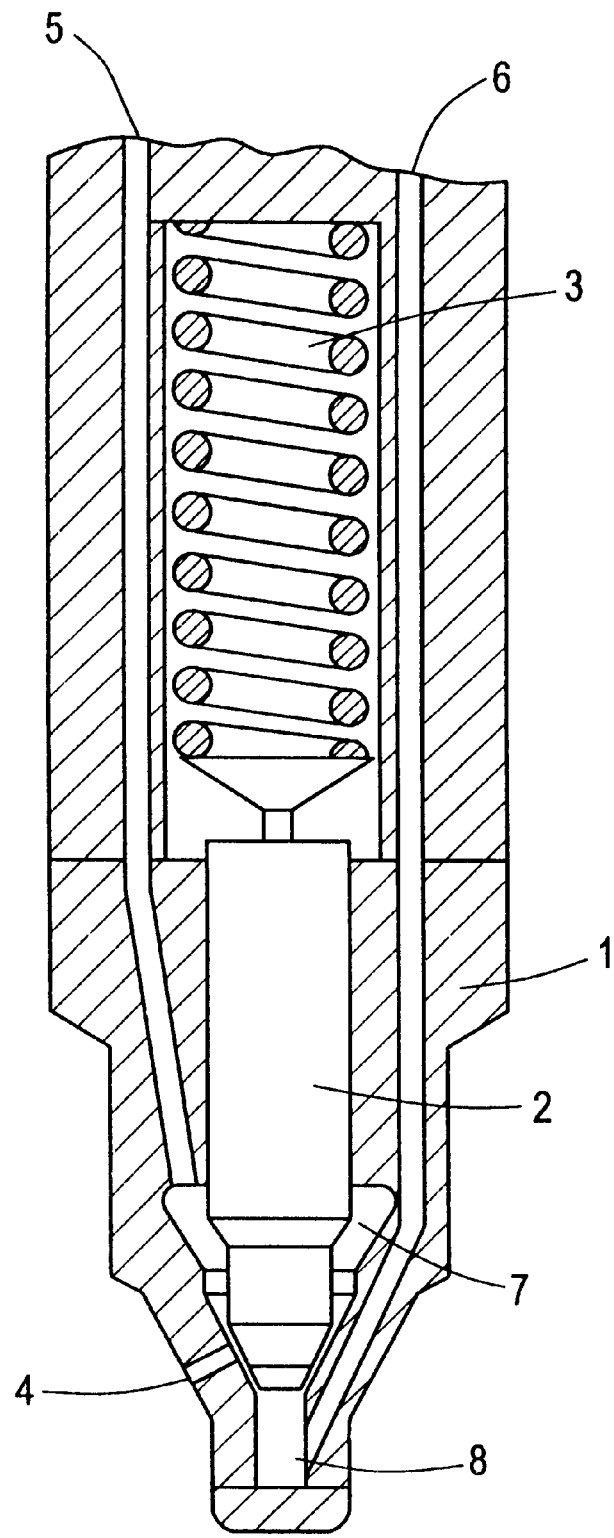
FIG. 1 represents a longitudinal section through an injection nozzle, with which two liquids can be alternately injected.

The structure and the mode of functioning of a common injection nozzle for the alternating injection of two liquids—that is, preferably of the diesel fuel and an aqueous $H_2O_2$ solution—is explained in more detail below: FIG. 1 shows an injection nozzle in the form of a modified so-called seat hole nozzle in a longitudinal section.

The injection nozzle consists of a housing 1 with a closure part 2 in the form of a so-called needle valve, which is supported therein and can be moved axially. The needle valve, which acts as a closure part 2, is acted on by a spring 3 in the closed position. The tip of the closure part 2 has a conical shape and in the closed position in the housing 1, closes exit openings 4, exiting radially.

FIG. 1 shows only one exit opening 4; preferably, the housing has two or more exit openings, so as to attain an optimal distribution of the liquids to be injected into the combustion chamber.

Through the exit openings 4, it is possible to alternately inject into the housing 1 liquids 5 or 6, to be introduced under pressure, of which liquid 5 should be a first liquid and liquid 6, a second liquid different from the first liquid.

Basically, it is possible to inject both liquids simultaneously with this apparatus. For the application of the nozzle, in accordance with the invention, however, essentially only one alternating injection of one or the other liquid is taken into consideration.

The closure part 2 can be opened by the pressure of the liquid pressing on it. If the second liquid 6 has a pressure under which the closure part 2 closes the exit openings 4 under the force of the spring 3 with a nonexistent or slight pressure of the first liquid 5, the closure part 2 can be moved into a position releasing the exit openings 4 by an increase of the pressure of the first liquid 5. For this purpose, the areas of the sliding part 2, which are adjacent to a first liquid chamber 7 in the sliding direction of the closure part 2, are designed in such a manner that with a high pressure within the first liquid, sufficient with reference to the force of the spring, a move of the closure part 2 into the open position of the exit openings 4 takes place. If a reflux is not possible in the supply conduit of the second liquid 6, only the first liquid 5 exits from the exit openings 4 in a nozzle opened by the pressure of the first liquid 5.

If the pressure of the first liquid 5 has declined to such an extent that with reference to the pressure of the second liquid 6 and the closing force coming from the spring 3, a closing of the exit openings 4 takes place by the closure part 2, the closure part 2 can also be opened by the pressure increase within the second liquid 6. If a reflux of the first liquid 5 is not possible, then only the second liquid 6 exits from the exit openings 4 due to the pressure of the second liquid 6 found in a second liquid chamber.

By the alternating pressure action of the liquids 5 and 6, the first and second liquids 5,6 can be injected, alternatingly, from one and the same spray nozzle.

When using such a nozzle to carry out the method of the invention, diesel fuel can be injected alternatingly as the first liquid and a hydrogen peroxide-containing liquid, as the second liquid.

Figure 2:
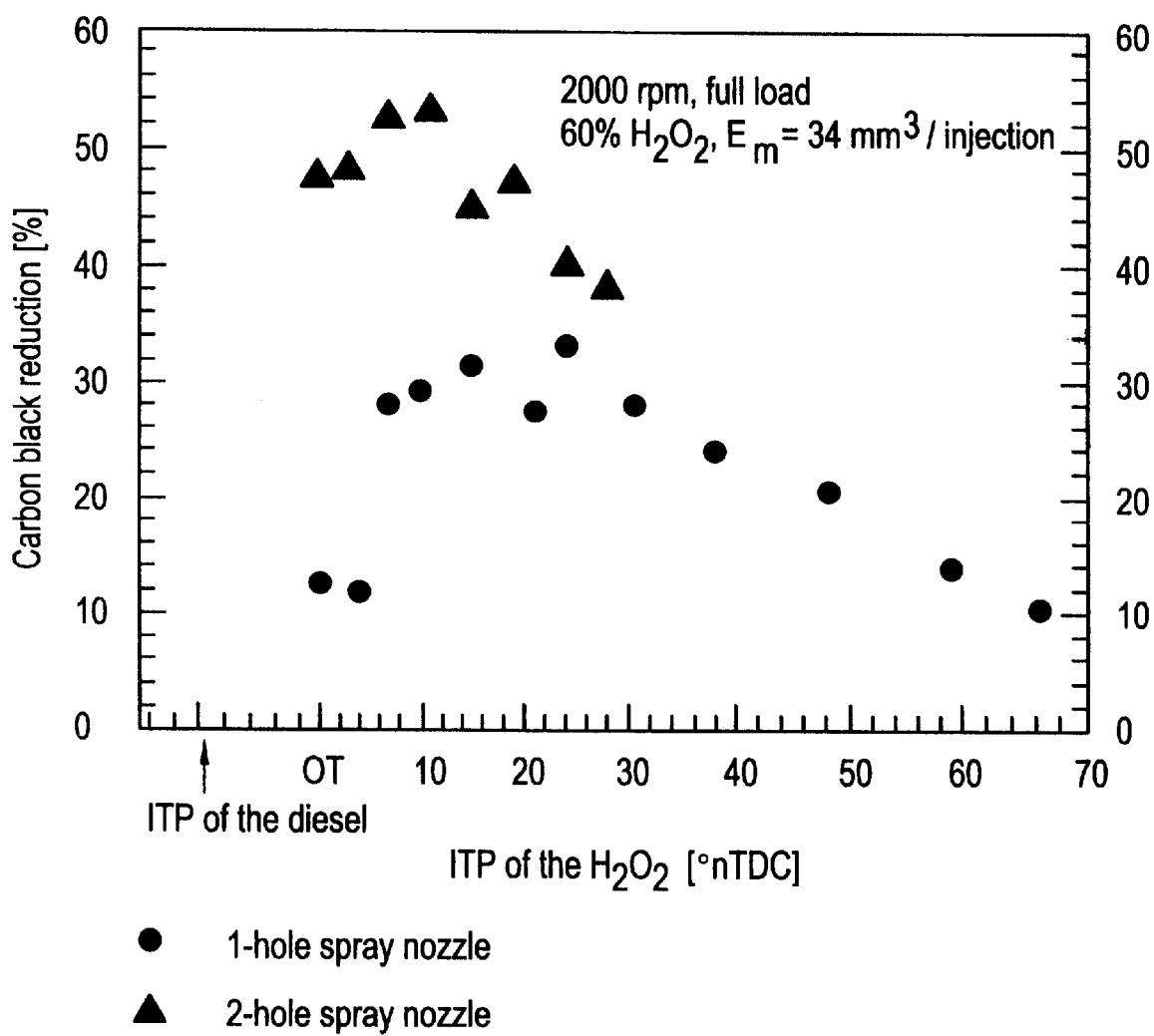
FIG. 2 shows the graphical representation of the measured carbon black reduction in % in a diesel motor by $H_2O_2$ injection as a function of the injection timepoint, using a 1-hole and a 2-hole nozzle.
Figure 3:
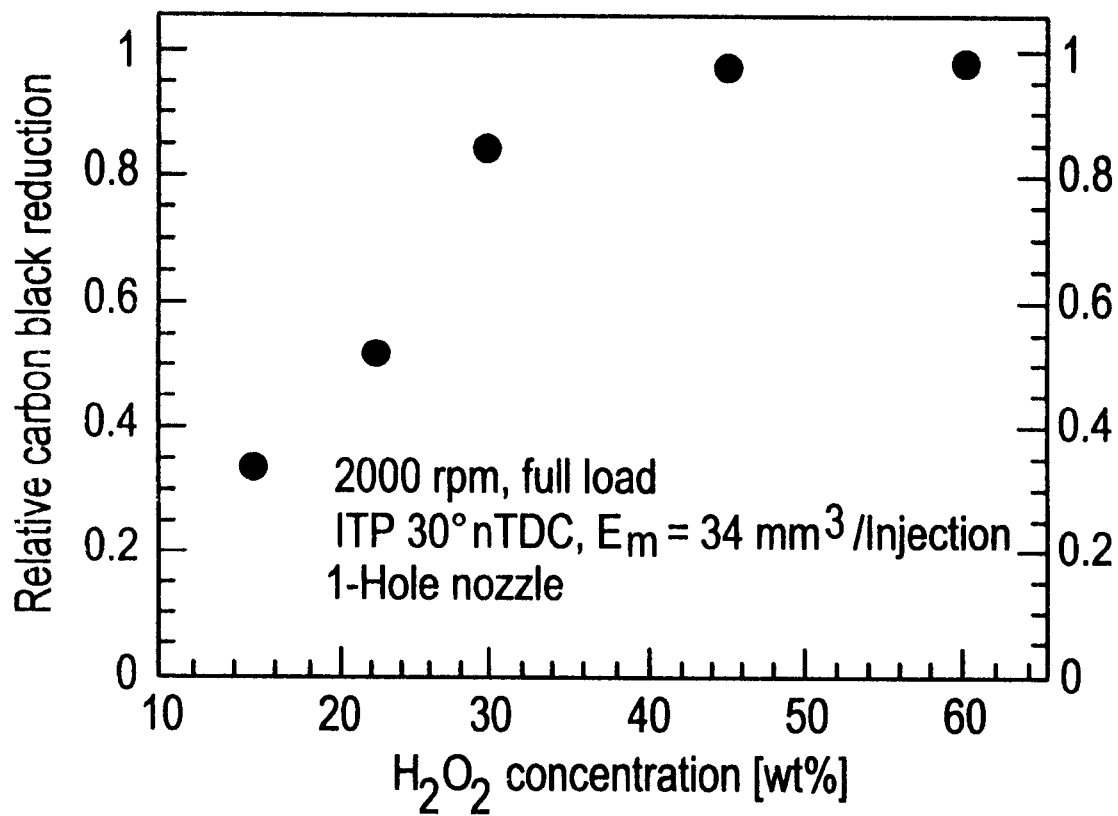
FIG. 3 shows the relative carbon black reduction as a function of the concentration of the aqueous $H_2O_2$ solution, using a 1-hole nozzle.

It follows from FIGS. 2 to 4 (details can be found in the examples) that the correct selection of the injection timepoint (ITP) and the good distribution of the aqueous hydrogen peroxide in the combustion chamber have the greatest influences on the reduction of carbon black. Above a minimum concentration and a minimum injection quantity, the $H_2O_2$ concentration and the injection quantity have a smaller significance for the carbon black oxidation than the injection timepoint. A preferred ITP with 2000 rpm and a full load lies between 5° and 30° crank angle after the top dead center, if the diesel fuel injection begins at approximately 10° C. crank angle before the top dead center. A particularly preferred $H_2O_2$ solution exhibits an $H_2O_2$ content between 30 and 60 wt %; in actual practice, the $H_2O_2$ concentration will be mostly 40 to 50 wt %. The optimal injection of $H_2O_2$ solution with full load lies above 50% to 100% of the injected diesel quantity.

Another improved mixture after the injection of the evaporating $H_2O_2$ solution with the residual gas can be expected by using spray nozzles with more than 2 holes, perhaps 4-hole or 5-hole spray nozzles, with optimized borehole diameters and injection angles. Also by increasing the injection pressure, a better distribution in the combustion chamber can be attained. By using a combined injection nozzle according to FIG. 1, in which diesel and an aqueous hydrogen peroxide solution are injected one after another, it is possible to attain that the OH radicals needed for the carbon black oxidation are formed where they are needed to complete the combustion and thus the reduction of the carbon black content in the waste gas. In this way, the quantity of $H_2O_2$ needed for the maximum carbon black reduction can be further reduced.

EXAMPLES

The experiment results shown in FIGS. 2 to 4 were determined in an air-cooled, directly injected one-cylinder, four-phase diesel engine: maximum power, 9.9 kW; maximum torque, 37 Nm at 2000 rpm; stroke volume, 625 $cm^3$; stroke, 110 mm; borehole, 85 mm; valves, 2; compression 17:1. For the investigations, the cylinder head was modified by accepting a second injection nozzle and the affixing of the spray nozzle holder. By using a second injection pump, it was possible to vary the timepoint and the quantity of the $H_2O_2$ injection, independent of the load point of the engine and of the diesel injection. The diesel injection pump attained a maximum injection pressure of 400 bar; a symmetrically injecting four-hole spray nozzle was used. The injection pump for the $H_2O_2$ solution attained an injection pressure of a maximum 450 bar; injection nozzles with one and two holes were used.

The $H_2O_2$ injection time point (ITP) was investigated, wherein, the angle measurement of the crankshaft after the top dead center (TDC) was used as the measure; the injection of the diesel fuel began at approximately 10° crank angle before the top dead center. The ITP was in the range of TDC up to 66° after the TDC (see FIG. 2). The $H_2O_2$ concentrations were also varied in the range of 15 wt % to 60 wt % (see FIG. 3); the injection quantity $E_m$ per injection varied from 2.6 to 34 $mm^3$ injection (see FIG. 4). The injection quantity $E_m$ corresponded to 5 to 100% of the diesel injection quantity with a nominal rpm and full load.

In FIG. 2, the measurement results for the carbon black reduction are plotted versus a variation of the injection timepoint (ITP) of the $H_2O_2$ for two nozzle variants. The engine was operated at 2000 rpm and full load. The $H_2O_2$ concentration was 60%; the injection quantity $E_m=34$ $mm^3$/injection; the quantity of aqueous $H_2O_2$ corresponded approximately to 100% of the injected diesel quantity at the measured operating point. The ITP of the diesel was at 10° before the top dead center (TDC) at the selected rpm.

From FIG. 2, it follows that both with the 1-hole spray nozzle as well as with the 2-hole spray nozzle, a clear increase in the carbon black reduction to an optimum is, at first, connected with an increase in the ITP. Subsequently, the curve of the carbon black reduction again declines slowly. It can be seen that under conditions which are otherwise the same, substantially more carbon black can be oxidized by the 2-hole spray nozzle than by the 1-hole spray nozzle. With an injection timepoint of 11° after the TDC, a carbon black reduction by 54% is attained with the 2-hole spray nozzle. On the other hand, only an approximately 34% carbon black reduction is attained when using the 1-hole spray nozzle. The reason for this lies apparently in a better distribution of the $H_2O_2$ in the combustion chamber. Since only a small time window exists for the carbon black oxidation, the optimal mixture of the $H_2O_2$ with the residual gas has a substantial importance. The favorable time window in which a large amount of carbon black is oxidized lies between 7° crank angle (CA) and approximately 30° CA after the TDC with the 1-hole spray nozzle. With the 2-hole spray nozzle, the range is shifted to somewhat earlier times. An additional carbon black reduction can be expected by the use of nozzles with more than two holes, perhaps a four-hole spray nozzle.

The results of a variation of the $H_2O_2$ concentration are plotted in FIG. 3. The axis of the carbon black reduction was thereby standardized with the measured maximum carbon black reduction. The essential information of the figure is that beyond a certain concentration of the $H_2O_2$—here approximately 45 wt %—a further reduction of the carbon black quantity in the waste gas can no longer be attained with additional concentration increases. Comparable results are yielded with other selected injection timepoints and rpm.

FIG. 4 gives the results of the measurements for the variation of the injected quantity of $H_2O_2$ solution with a content of 60 wt % $H_2O_2$. Here too, the carbon black reduction was standardized with the maximum value. The absolute value in $mm^3$/injection is plotted on the lower axis for the injection quantity, and this value is related to the injected diesel quantity on the upper axis. A slight dependence of the carbon black reduction on the injection quantity was revealed. This means that even with small quantities of $H_2O_2$, a clear effect is manifested. Since it can be assumed that with an increased injection quantity and thus higher injection times, there is a better distribution in the combustion chamber, it is also possible to explain the better carbon black oxidation with a greater injection quantity.

The method of the invention can be used both with steady-state as well as nonsteady-state diesel engines.

What is claimed is:

1. A method for reducing the soot content in the exhaust gas of a diesel motor in whose combustion chamber diesel motor fuel is injected via a timed system and burned, and each time after the injection and burning of the fuel begins, a diluted liquid containing a peroxy compound is introduced into the combustion chamber;

wherein the liquid containing said peroxy compound has a peroxy compound content between 30 and 60% by weight of said liquid and injected in an amount of 50 to 100% by weight of said diesel motor fuel using a nozzle that has more than one hole, and wherein said nozzle alternatively squirts out both the diesel motor fuel and the liquid containing the peroxy compound.

2. The method according to claim 1, wherein the liquid containing the peroxy compound is introduced into the combustion chamber at a 5° to 40° crank angle after the injection of the diesel motor fuel begins.

3. The method according to claim 1, wherein the injection of the diesel motor fuel occurs at a 5° to 15° crank angle before the top dead center and the liquid containing the peroxy compound is introduced into the combustion chamber at a 5° to 30° crank angle after the top dead center.

4. A method for the reduction of the carbon black in the waste gas of a diesel engine, in whose combustion chamber diesel fuel is injected and burned in cycles, wherein after beginning the injection and combustion of the fuel, a liquid containing a peroxy compound is injected into the combustion chamber, wherein the peroxy compound is selected from the group consisting of hydrogen peroxide and organic peroxy compounds, and wherein the injection of diesel fuel and the liquid containing a peroxy compound is done with a nozzle for the alternating injection of the two liquids.

5. The method according to claim 4, wherein the peroxy compound-containing liquid is injected into the combustion chamber at a 5° to 40° crank angle after beginning the injection of the diesel fuel.

6. The method according to claim 4, wherein the diesel fuel injection occurs at a 5° to 15° crank angle before the top dead center and the peroxy compound-containing liquid is injected into the combustion chamber at a 5° to 30° crank angle after the top dead center.

7. The method according to claim 4, wherein the peroxy compound-containing liquid is in the form of an aqueous solution.

8. The method according to claim 7, wherein an aqueous hydrogen peroxide solution with a hydrogen peroxide content of 10 to 75% by weight is supplied as the peroxy compound-containing liquid.

9. The method according to claim 4, wherein the peroxy compound-containing liquid is supplied in a quantity of 50 to 100% by weight, based on the quantity of diesel fuel.

10. The method according to claim 4, wherein the liquid containing the peroxy compound is injected with a nozzle having more than one hole.

11. The method according to claim 1, wherein the liquid containing the peroxy compound is injected using a nozzle that has two to five holes.

12. The method according to claim 10, wherein the liquid containing the peroxy compound is injected with a nozzle having two to five holes.

* * * * *